March 23, 1937.     J. D. DURANT     2,074,895
INDICATOR
Filed May 25, 1933     2 Sheets-Sheet 1
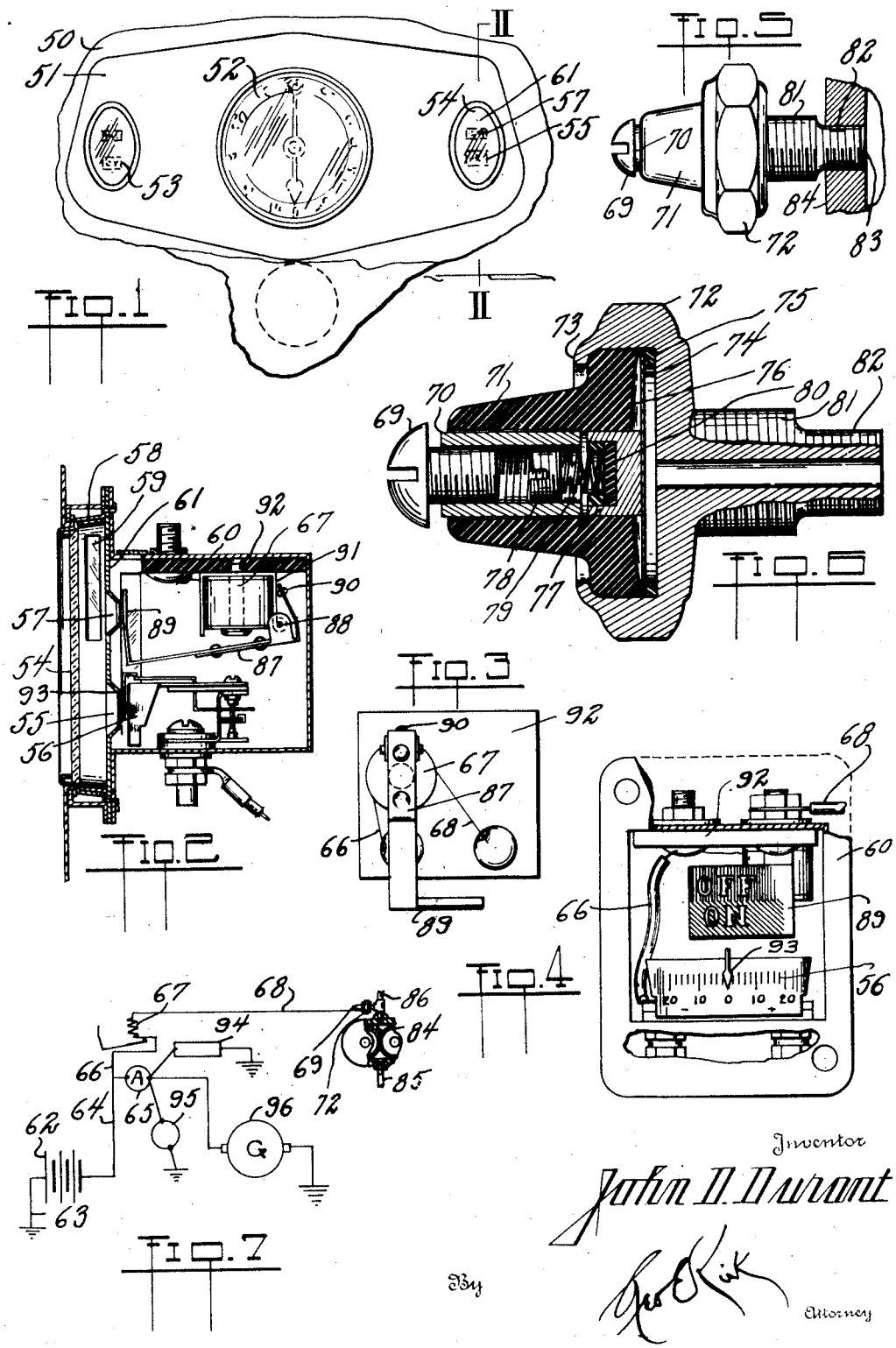
Inventor
John D. Durant March 23, 1937.                J. D. DURANT                2,074,895
                                 INDICATOR
                          Filed May 25, 1933           2 Sheets-Sheet 2
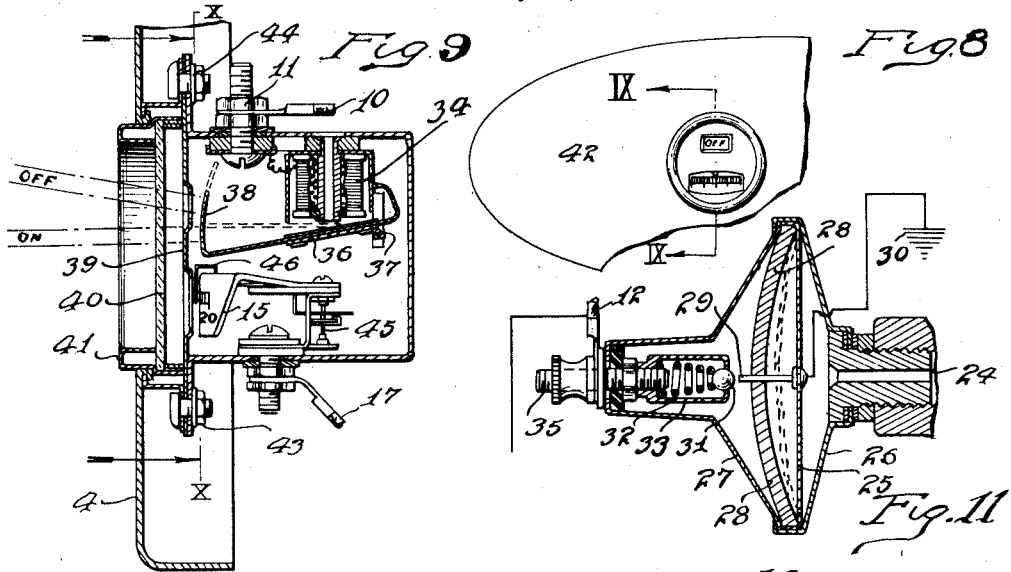
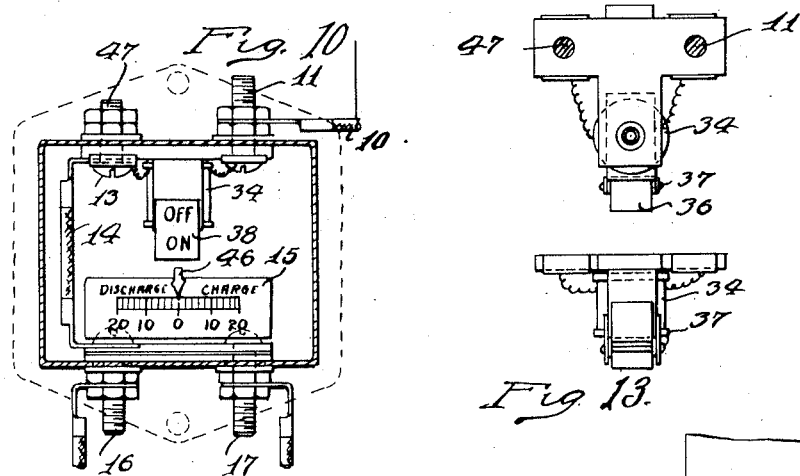
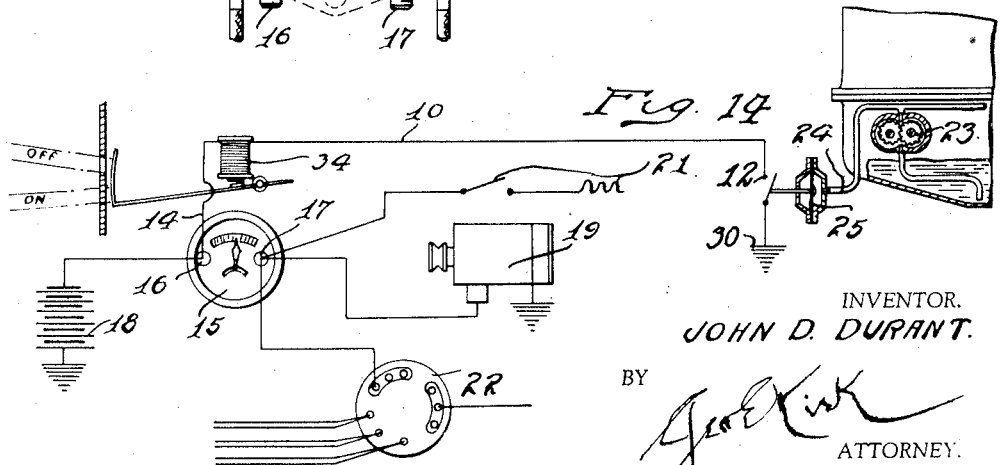
INVENTOR.
JOHN D. DURANT.
BY
ATTORNEY.

Patented Mar. 23, 1937

2,074,895

UNITED STATES PATENT OFFICE 2,074,895

INDICATOR

John D. Durant, Adrian, Mich., assignor to Schwarze Electric Company, Adrian, Mich., a corporation of Michigan Application May 25, 1933, Serial No. 672,863

3 Claims. (Cl. 177—311)

This invention relates to indication of remote conditions, more particularly for ready disclosure, on the dash or instrument panel of a motor vehicle, of motor conditions, preferably by electrical connection between the motor and the panel.

This invention has utility when incorporated in a visible oil pressure device adapted to be installed on the instrument panel or dash of an automobile without the necessity of connecting an oil pressure tube. As adopted herein the connection is with an ammeter. The flexible mounting of a modern automobile engine relatively to its chassis renders the use of a pipe or tubing from the engine or the dash subject to strains. This device is adapted to operate by means of an electrical current supplied from the ordinary storage batteries. By mounting the device adjacent to the ammeter, only one wire is required to operate the indicator which makes the device commercially practicable. Additional objects of this invention are to provide:—

(1) Means for taking care of the excessive pressures created when an engine starts in cold weather.

(2) Means which will automatically indicate when the device is out of order, so that if the electrical circuit fails the device will signal "off", thus disclosing the failure of the electricity and avoiding misleading the car operator by a false sense of security.

Referring to the drawings:

Fig. 1 is a fragmentary view of an instrument board or panel as in front of the driver's seat of an automobile;

Fig. 2 is a detail view in vertical section on an enlarged scale on the line II—II, Fig. 1;

Fig. 3 is a plan view of the indicator of Fig. 2;

Fig. 4 is a front view of the device of Fig. 2 as back of the panel or glass;

Fig. 5 is a detail view of the pressure responsive switch and its housing;

Fig. 6 is a section on an enlarged scale through the plug or device of Fig. 5;

Fig. 7 is a wiring diagram;

Fig. 8 is a fragmentary view of a central dash or panel section for an automobile;

Fig. 9 is a section on the line IX—IX, Fig. 8;

Fig. 10 is a section on the line X—X, Fig. 9;

Fig. 11 is a detail view of the pressure control switch;

Fig. 12 is a plan view of the electro-magnet and oil pressure indicator of Fig. 10;

Fig. 13 is an elevation of the magnet and its operating indicator of Fig. 12; and Fig. 14 is a wiring diagram of the installation.

Wire 10 connects means responsive to oil pressure with oil pressure indicating means having a terminal 11. Terminal 12 is on the means responsive to oil pressure. Terminal 13 (Fig. 10) is at the oil pressure device. Wire 14 from terminal 13 extends to ammeter 15 and there is connected to terminal 16. The ammeter 15 has a second terminal 17. The terminal 16 on the ammeter 15 is connected to battery 18 and the terminal 17 is connected to generator 19, to ignition circuit 21, and to light switch 22. Oil pump 23 (Fig. 14) provides circulation from the engine. Oil passage 24 from the engine extends to flexible diaphragm 25 which is mounted in a housing comprising casing 26 and cover 27 (Fig. 11). Also, mounted in this housing is over-pressure plate 28 which protects the diaphragm 25 from excessive pressure. This diaphragm 25 carries movable contact 29 of a switch which has ground connection 30 on the engine. Contact 31 of this switch is also movable, being held in place by spring 32 in cage 33.

The oil pressure device (Figs. 9 to 14, inc.) includes electro-magnet 34 (Fig. 9) having a hollow central core. Wires 10 and 14 extend from the coil of this magnet. When the oil pressure rises it flexes the diaphragm 25 to cause the contact 29 to engage the contact 31. The cage 33 is mounted on threaded bolt 35 which is insulated from the housing and provides mounting for the terminal 12. At the oil device, the electro-magnet 34 has oscillating keeper or armature 36 having hinge mounting 37 and target or indicator 38. This target carries the words "On" and "Off" corresponding to the two conditions—normal oil pressure and low oil pressure respectively. Oil pressure of less than, say 3½ pounds per square inch is "off". The target is viewed through perforated shield 39 and glass window 40. The shield and window are mounted in "spun over" cover 41. This gage is mounted in dash panel 42. The gage is clamped to the panel 42 by bolts 43, 44.

Below the oil device is the ammeter 15, having vertical shaft 45 mounting oscillating pointer 46. By locating the ammeter closely adjacent to the oil device, the cost of installation is reduced, as only a very short wire 14 is required to convey current from the ammeter electric circuit to the oil device electro-magnet which operates the target. This assembly permits the completion of this oil device circuit by the use of but one branch wire or connection from the regular wiring of the automobile.

In operation:—

If for any reason the electric current fails, the device will automatically fall into the "off" position, so that there will be no danger of misleading the driver into a false sense of security. Another important advantage is that, if the oil pressure is dangerously low at the critical stage of stability, the diaphragm 25 pulsates slightly and the yieldable contacts 29, 31, are made and broken repeatedly. This critical stage is accentuated by the failure of the pump to pull liquid, which pressure drop causes the indicator to flutter. This causes the target to flash up and down and thus attracts the driver's attention. It does more. There is a characteristic clicking sound as the keeper 36 strikes the electro-magnet 34; so that, even if the driver's eyes are otherwise engaged, the driver's attention will be forcibly and emphatically held by this annoying and persistent noise. In order to make the signal still more reliable, the letters "On" are in green and "Off" in red, the recognized danger signal, with a yellow line in between. These colors are put on to a white background and are transparent, brilliant colors having a mirror surface, which reflects light. The device is thus made so that there can be no doubt as to the nature of the warning conveyed. The hollow armature or core to the magnet 34 serves to vent the case in which the mechanism is housed. This venting prevents frosting of the glass 40 in cold weather.

Motor vehicle dash 50 is shown as having instrument panel 51 (Fig. 1). This instrument panel 51 has thereon speedometer 52 and indication window 53, say heat indicator above and gasoline indicator device below. Indicator window 54 may show, at recess 55, graduated scale 56 of an ammeter. At recess 57 thereabove there may be shown oil indicator for pressure of the invention herein. This window 54 has offset or spacer 58 with transparency 59 for illumination back of the panel 51 to be effective on the various instruments of the panel and to be effective for the recess 57. Mounted on this spacer 58 is housing 60, spaced from this spacer 58 by front 61 which has the recesses 55, 57, therein. Battery 62 (Fig. 7) has line 63 extending to ground from one side thereof and line 64 on the other side thereof to ammeter 65. From this ammeter 65, there extends line 66 to coil 67. From this coil 67 extends line 68 to terminal 69, herein shown as screw in sleeve 70 anchored in insulation 71. This insulation 71 is mounted in housing member 72 and held in position by pressed-in rim 73, thereby anchoring diaphragm 74 against gasket 75. The portion of this insulation member 71 toward the diaphragm 74 has dished-out portion 76 for diaphragm shifting and moving block 77 aligned with the sleeve 70. In this sleeve 70 is adjustable screw 78, adjustable to vary the compression of spring 79 as seating insulation 80 in the block 77.

Accordingly, as the diaphragm 74 is shifted, it may be effective through the block 77, as its movement is resisted by the insulated spring 79 to shift this block 77 to take up the clearance between the block 77 and thereby acting as a switch and closing circuit from the line 68 to the diaphragm 74 and the housing 72 as a ground.

This housing 72 has threaded portions 81, 82, thus serving as an automatic adapter to correspond to different conditions as found in general practice, and thereby connecting to passage 83 from pump 84 as drawing off from line 85, say in the crank case and delivering such to the various bearings or moving parts of the internal combustion engine of the automobile. This circuit as thus energized by the pump 84, driven from the engine and building up pressure in passage 86 from the passage 83, acts on the diaphragm 74. As this pressure is effective at the adjusted condition to close the switch 77, 70, the current may flow to ground and thereby energize the coil 67. This coil 67 as thus energized, attracts armature 87 (Fig. 2) mounted on pivot pin 88. This lifts indicator plate 89 from the drop position showing "off", say in red, to the position "on", say in green, showing that the pressure has been built up. Extension 90 is a limit stop for this throw of the plate 89 when in the "on" position, for the armature 87 to engage bracket 91. At the "off" position, this stop 90 engaged the bracket 91 mounting the coil 67 adjacent insulation block 92 in the housing 60.

The operator of the vehicle has thus in ready view not only indicating pointer 93 at the ammeter scale 56 but the oil pressure condition for the motor. This device is one which may be readily installed as an accessory, or be supplied as the regular equipment. It is simple and substantial. There is no occasion to throw any ignition switch or make other connection, for the shutting off of the motor results in drop of pressure at the diaphragm 74, thereby automatically opening the switch to cut out this circuit from the battery 62. When the motor stops, the oil pump 23 also stops bringing about the pressure drop as pointed out for opening the switch at the diaphragm 74. The ammeter 65 may be connected up in the usual manner to ignition 94, illumination devices 95, and generator 96.

The cooperation herein between the diaphragm-operated switch and the oscillating lever indicator is beyond that of mere "on" and "off". It is true the indicator will show the pressure built up or "on" indication, even upon cranking of the engine for the vehicle before the ignition switch of the automobile is turned on. It is thus, in this regard a true pressure indicator. However, there is further audible warning from oscillation of the lever. This can occur before there is a critical danger region of low oil but at the point, in the Ford type of motor vehicles, when the pump, due to its location, handles air as well as oil. This operation causes the lever to swing up and down and the noise will attract the attention of the driver, thus signaling the driver that the oil needs attention.

Instead of being low oil, a condition may arise of low pressure due to excessive thinness of the oil from overheating or dilution. It is accordingly seen that this device is a condition-disclosing apparatus as well as a pressure indicator in its functioning hereunder.

What is claimed and it is desired to secure by Letters Patent is:

1. For an internal combustion engine for a motor vehicle having an electrical system and a lubrication system including a pump for building up oil pressure in the lubrication system, comprising a pressure responsive circuit closer, an electric circuit controlled by said circuit closer, an indicator comprising a coil, a core member for said coil, an armature for the coil, an indicator plate attached to said armature and visible to the operator of the vehicle, said coil being connected to said electric circuit whereby when said circuit closer is in circuit closing position the armature will be attracted into contact with said core, the armature being intermittently attracted in response to intermittent operation of the circuit closer to give an intermittent visual and audible signal upon substantial depletion of the oil supply.

2. For an internal combustion engine for a motor vehicle having an electrical system and a lubrication system including a pump for building up oil pressure in the lubrication system, comprising a pressure responsive circuit closer, an electric circuit controlled by said circuit closer, an indicator comprising a coil, a core member for said coil, an armature for the coil, an indicator plate attached to said armature and visible to the operator of the vehicle, said coil being connected to said electric circuit whereby when said circuit closer is in circuit closing position the armature will be attracted into contact with said core, the armature being intermittently attracted in response to intermittent operation of the circuit closer to give an intermittent visual and audible signal upon substantial depletion of the oil supply, and a stop limiting the clearance of the armature as to the core, thereby to restrict the travel of the armature during said intermittent operation.

3. For an internal combustion engine for a motor vehicle having an electrical system and a lubrication system including a pump for building up oil pressure in the lubrication system, comprising a pressure responsive circuit closer, an electric circuit controlled by said circuit closer, an indicator comprising a coil, a core member for said coil, an armature for the coil, an indicator plate attached to said armature and visible to the operator of the vehicle, said coil being connected to said electric circuit whereby when said circuit closer is in circuit closing position the armature will be attracted into contact with said core, the armature being intermittently attracted in response to intermittent operation of the circuit closer to give an intermittent visual and audible signal upon substantial depletion of the oil supply, and a housing for the indicator, said core being hollow to provide a vent therethrough from the housing.

JOHN D. DURANT.